US010066832B2

(12) United States Patent
Disselhorst et al.

(10) Patent No.: US 10,066,832 B2
(45) Date of Patent: Sep. 4, 2018

(54) BURNER FOR THE GASIFICATION OF A SOLID FUEL

(75) Inventors: Johannes Hermanus Maria Disselhorst, Castricum (NL); Franciscus Gerardus Van Dongen, Amsterdam (NL)

(73) Assignee: Air Products and Chemicals, Inc., Allentown, PA (US)

(*) Notice: Subject to any disclaimer, the term of this patent is extended or adjusted under 35 U.S.C. 154(b) by 1102 days.

(21) Appl. No.: 13/876,403

(22) PCT Filed: Sep. 26, 2011

(86) PCT No.: PCT/EP2011/066671
§ 371 (c)(1),
(2), (4) Date: Jul. 29, 2014

(87) PCT Pub. No.: WO2012/041808
PCT Pub. Date: Apr. 5, 2012

(65) Prior Publication Data
US 2015/0041718 A1    Feb. 12, 2015

(30) Foreign Application Priority Data

Oct. 1, 2010  (EP) .................................. 10185547

(51) Int. Cl.
*C01B 3/02* (2006.01)
*F23D 1/00* (2006.01)
(Continued)

(52) U.S. Cl.
CPC ............... *F23D 1/005* (2013.01); *C01B 3/02* (2013.01); *C10J 3/485* (2013.01); *C10J 3/506* (2013.01);
(Continued)

(58) Field of Classification Search
CPC ........................................................ F23L 7/00
See application file for complete search history.

(56) References Cited

U.S. PATENT DOCUMENTS 1,910,735 A * 5/1933 Zikesch ................. F23C 3/008
110/104 R
4,350,103 A * 9/1982 Poll ......................... C10J 3/487
110/264
(Continued)

FOREIGN PATENT DOCUMENTS

AU    1819683    3/1983
AU    3020984    1/1985
(Continued)

*Primary Examiner* — Gregory Huson
*Assistant Examiner* — Martha Becton
(74) *Attorney, Agent, or Firm* — Bryan C. Hoke, Jr.

(57) ABSTRACT

The invention is directed to a burner for the gasification of a solid fuel, comprising a burner front having an opening for discharging a solid fuel, wherein the opening for discharging the solid fuel is fluidly connected to a central passage way and wherein the central passage way has a downstream part wherein the diameter of the passage way increases over a first length and subsequently decreases over a second length terminating at the burner front and wherein inside the downstream part of the central passage way a hollow member is positioned, and wherein the hollow member has an internal increasing diameter and inner decreasing diameter aligned with the increasing and decreasing diameter of the hollow member and wherein the connecting conduits have a discharge opening positioned in the diverging part of the hollow member.

15 Claims, 1 Drawing Sheet

(51) Int. Cl.
*C10J 3/50* (2006.01)
*F23L 7/00* (2006.01)
*C10J 3/48* (2006.01)
*F23D 99/00* (2010.01)

(52) U.S. Cl.
CPC ............... *F23D 1/00* (2013.01); *F23D 91/02* (2015.07); *F23L 7/00* (2013.01); *F23L 7/007* (2013.01); *C10J 2200/152* (2013.01); *C10J 2300/093* (2013.01); *C10J 2300/0933* (2013.01); *C10J 2300/0936* (2013.01); *C10J 2300/1223* (2013.01); *F23D 2201/20* (2013.01); *F23D 2214/00* (2013.01); *F23D 2900/00006* (2013.01); *F23L 2900/07005* (2013.01)

(56) References Cited

U.S. PATENT DOCUMENTS

| | | | | |
|---|---|---|---|---|
| 4,443,228 A * | 4/1984 | Schlinger | ................ | C01B 3/363 239/112 |
| 4,458,607 A * | 7/1984 | Schoeber | ................ | C10J 3/506 110/263 |
| 4,525,175 A * | 6/1985 | Stellaccio | ................ | C10J 3/506 239/132.3 |
| 4,752,303 A * | 6/1988 | Materne | ................... | C10J 3/506 239/132.3 |
| 4,858,538 A * | 8/1989 | Kuypers | ................... | C10J 3/506 110/263 |
| 4,865,542 A * | 9/1989 | Hasenack | ................ | C10J 3/506 110/263 |
| 4,887,962 A * | 12/1989 | Hasenack | ............... | F23D 14/78 110/263 |
| 8,048,178 B2 * | 11/2011 | Smit | ......................... | C01B 3/36 252/373 |
| 8,703,094 B2 * | 4/2014 | Van Den Berg | .......... | C01B 3/16 423/655 |
| 9,032,623 B2 * | 5/2015 | Boer | ....................... | C01B 3/363 29/890 |
| 9,546,784 B2 * | 1/2017 | Van Der Ploeg | ........ | C10J 3/506 |
| 2013/0087743 A1 * | 4/2013 | Disselhorst | ............... | C01J 3/506 252/373 |

FOREIGN PATENT DOCUMENTS

| | | |
|---|---|---|
| CN | 1042596 | 5/1990 |
| CN | 101363622 | 2/2009 |
| CN | 101363624 | 2/2009 |
| EP | 0108425 | 5/1984 |
| EP | 0108427 | 5/1984 |
| EP | 130630 | 1/1985 |
| EP | 328794 | 8/1989 |
| EP | 0367966 | 5/1990 |
| JP | 2000026870 | 1/2000 |
| WO | WO9532148 | 11/1995 |

* cited by examiner

BURNER FOR THE GASIFICATION OF A SOLID FUEL

PRIORITY CLAIM

The present application claims priority from PCT/EP2011/06671, filed 26 Sep. 2011, which claims priority from European application 10185547.6, filed 1 Oct. 2010, which is incorporated herein by reference.

FIELD OF THE INVENTION

The invention is directed to a burner for the gasification of a solid fuel. The burner is particularly suitable for use in the gasification of carbonaceous fuels, such as finely divided solid fuel carried by a gas carrier, e.g., pulverized coal carried by a gas carrier such as nitrogen gas and/or carbon dioxide, using an oxygen-containing gas, e.g., for producing pressurized synthesis gas, fuel gas or reducing gas.

BACKGROUND OF THE INVENTION

Gasification of a solid carbonaceous fuel is obtained by the reaction of the fuel with oxygen. The fuel mainly contains carbon and hydrogen as combustible components. The gas-carried finely divided carbonaceous fuel and the oxygen-containing gas are passed via the separate channels in the burner into a reactor at relatively high velocity. In the reactor a flame is maintained in which the fuel reacts with the oxygen in the oxygen-containing gas at temperatures above 1300° C. to form mainly carbon monoxide and hydrogen.

Various burner designs have been proposed in the prior art. EP-A-328794 describes a burner wherein finely divided coal is supplied to a burner front via a central channel disposed along the longitudinal axis of the burner, and oxygen-containing gas is supplied via at least one annular channel surrounding said central channel. The oxygen is directed into the flow of coal at the burner front.

EP-A-130630 describes a burner wherein at the burner front, an oxygen containing gas is discharged from a central channel at high velocity and an oxygen containing gas is discharged from an annular outlet at a lower velocity. A solid fuel is discharged from a number of outflow openings located between said central and annular oxygen outlet openings. According to this publication, the outer low velocity oxygen stream serves to protect the burner against overheating due to suction of hot gasses. The publication discloses that if the burner is used for large throughputs, the outlet openings for the solid fuel are preferably not of an annular shape. It is stated that such a design would not result in a proper contact of all the solid fuel particles with oxygen.

The burner type according to EP-A-328794 has been used commercially with great success. However, at high throughputs the heat-flux to the burner front increases to such values that burner lifetimes may become too short.

EP-A-130630 addresses the issue of heat flux to the burner front by applying a low velocity oxygen shield around the flame. A disadvantage of the burner according to EP-A-130630 is that for high throughputs, the solid fuel is passed through separate channels to the burner front, which may cause erosion problems. Another problem is the complexity of the design due to the fact that one metal piece with multiple channels for solid fuel and oxygen containing gas needs to be manufactured.

SUMMARY OF THE INVENTION

The following burner aims at providing a burner which can be used for high throughputs and which does not have the disadvantages of the prior art burners:

a burner for the gasification of a solid fuel, comprising a burner front having an opening for discharging a solid fuel and a single central opening for discharging an oxygen containing gas, wherein the opening for discharging the solid fuel is fluidly connected to a central passage way and wherein the opening for discharging the oxygen containing gas is fluidly connected to an annular passage way for passage of oxygen positioned co-axially with the central passage way; and wherein the central passage way has a downstream part wherein the diameter of the passage way increases over a first length and subsequently decreases over a second length terminating at the burner front and wherein inside the downstream part of the central passage way, a hollow member is positioned that is closed at one end and has an opening at the burner front, the hollow member having an increasing diameter and decreasing diameter aligned with the increasing and decreasing diameter of the central passage way to form an annular passage for the solid fuel terminating at burner front in a inwardly directed annular opening for discharging the solid fuel; and wherein the hollow member is fluidly connected with the annular passage way for the oxygen containing gas by means of one or more connecting conduits and wherein the opening of the hollow member is the opening for discharging the oxygen containing gas at the burner front and wherein the hollow member has an internal increasing diameter and inner decreasing diameter aligned with the increasing and decreasing diameter of the hollow member and wherein the connecting conduits have a discharge opening positioned in the diverging part of the hollow member.

The invention is also directed to a process to prepare a mixture comprising hydrogen and carbon monoxide by means of gasification of a solid fuel using a burner as above, wherein an oxygen containing gas is passed through the passageway for oxygen containing gas, a solid fuel and a carrier gas are passed through a central passage and gasification takes place at burner front.

DETAILED DESCRIPTION OF THE INVENTION

Applicants found that in contrast to the teachings of EP-A-130630, a burner can be provided for high throughput operation which has an annular opening for the solid fuel. By directing all the oxygen through the central opening for oxygen containing gas, a sufficient contact with the solid fuel is achieved. Detailed computer simulations predict that the flame will be somewhat lifted from the burner front. This greatly decreases the heat flux to the burner front and thereby extends the lifetime of said burner front and the lifetime of the rim separating the annular passage for the solid fuel and the opening for discharging the oxygen containing gas.

The burner according to the invention does not have the annular outlet for discharging an oxygen containing gas at a lower velocity as in the burner according to EP-A-130630. Because of the alignment in dimensions of the hollow member and the central passageway a flow path for the solid fuel results, which limits erosion.

The term 'oxygen-containing gas' as used herein is intended to refer to gas containing free oxygen, $O_2$, and to include air, oxygen-enriched air (i.e., more than 21 mole % oxygen) and also substantially pure oxygen (i.e., more than about 95 mole % oxygen), with the remainder comprising gases normally found in air such as nitrogen, and/or rare gases.

The term 'solid carbonaceous fuel' as used herein is intended to include various, gas carried, combustible materials and mixtures thereof from the group of coal, coke from coal, coal liquefaction residues, petroleum coke, soot, biomass, and particulate solids derived from oil shale, tar sands and pitch. The coal may be of any type, including lignite, sub-bituminous, bituminous and anthracite. The solid carbonaceous fuels are preferably ground to a particle size so that at least about 90% by weight of the material is less than 90 microns and moisture content is less than about five percent by weight. The solid fuel is supplied to the burner in admixture with a carrier gas, preferably nitrogen or carbon dioxide.

The term high capacity burner as used herein is intended to include a process wherein more than 2 kg/sec of solids is discharged from the annular opening. The width of the annular opening of such a high capacity burner is preferably between 4 and 15 mm. The preferred velocity of solids as it is discharged from the annular opening is between 5 and 15 m/s.

DETAILED DESCRIPTION OF THE FIGURES

Figure 1:
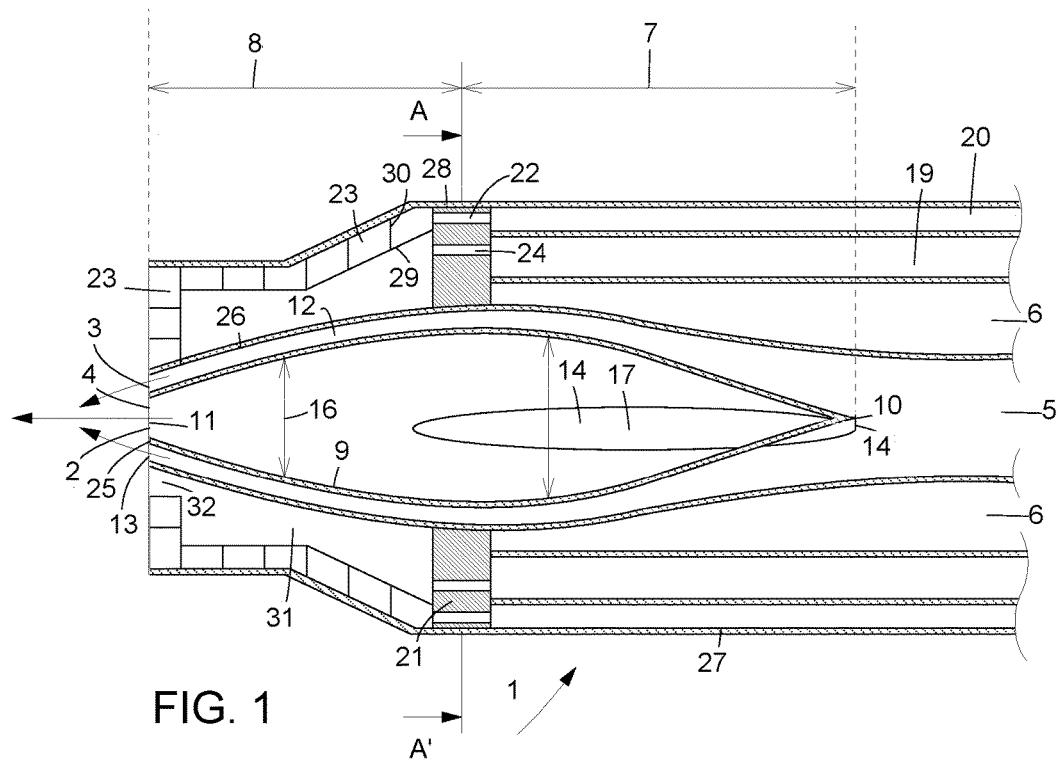
FIG. 1 shows a longitudinal section of the front part of a burner according to the invention.
Figure 2:
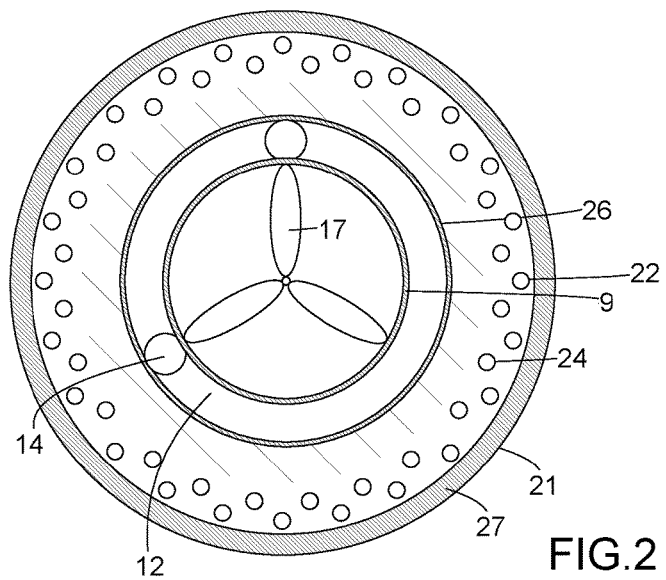
FIG. 2 shows a cross-sectional section AA' of the burner of FIG. 1.

The invention shall be further illustrated by means of the FIGS. 1 and 2. FIG. 1 shows a longitudinal section of the front part of a burner (1) according to the invention. Burner (1) has a burner front (2) having an opening (3) for discharging a solid fuel and a single central opening (4) for discharging an oxygen containing gas. The opening (3) for discharging the solid fuel is fluidly connected to a central passage way (5). Passageway (6) is positioned co-axially with the central passage way (5).

Central passage way (5) has a downstream part wherein the diameter of the passage way (5) increases over a first length (7) and subsequently decreases over a second length (8) terminating at the burner front (2). Inside the downstream part of the central passage way a hollow member (9) is positioned which is closed at one end (10) and has an opening (11) at the burner front (2). The hollow member (9) has an increasing diameter and decreasing diameter aligned with the increasing and decreasing diameter of the central passage way (5) to form an annular passage (12) for the solid fuel terminating at burner front (2) in a inwardly directed annular opening (13) for discharging the solid fuel. Preferably the alignment in diameter is chosen such that the width of the annular passage (12) remains substantially constant to limit erosion.

The hollow member (9) preferably has an internal increasing diameter (15) and inner decreasing diameter (16) aligned with the increasing and decreasing diameter of the hollow member (9). This defines a hollow space in the hollow member having a conical shaped part and a frusto-conical shaped part. The hollow member (9) is fluidly connected with the annular passage way (6) for the oxygen containing gas by means of one or more connecting conduits (14). The connecting conduits (14) are also the spacers which keep hollow member (9) positioned within the central passageway (5). The design of conduits (14) may be such that, when in use, a swirl is imparted to either the flow of solids or to the oxygen containing gas or to both. Preferably the connecting conduits (14) have a discharge opening (17) positioned in the diverging part, said otherwise in the conical part, of the hollow member (9). Discharge openings (17) suitably have an ellipsoidal form, wherein the longer dimension is aligned with the axis of the burner. In a preferred embodiment the number of openings (14) is 3. FIG. 1 also shows opening (11) of the hollow member at its frusto-conical shaped end, which opening is the opening (4) for discharging the oxygen containing gas at the burner front (2). The opening (4) for discharging the oxygen containing gas is thus fluidly connected to annular passage way (6) for passage of the oxygen containing gas via hollow member (9) and connecting conduits (14).

The dimensions and shape of the hollow member (9) are preferably so chosen that the oxygen containing gas is discharged from its opening (11) in an evenly distributed flow. Preferably the velocity of the oxygen containing gas as it is discharged from this opening is between 30 and 90 m/s. The shape of the hollow member comprises a conical end and a frusto-conical end at the burner front (2), wherein both parts are directly connected or optionally via a tubular part. The angle made by the slopes of the top of the conical end (10) is preferably between 5 and 40 degrees. This angle should not be too large in order to limit erosion at the point where the flow of solids is debouched from the central passage way (5) to the annular passage way (12).

Preferably the width of rim (25) of the hollow member (9) at burner front (2) separating the opening (3) for discharging a solid fuel from the opening (4) for discharging an oxygen containing gas is between 0.5 and 3 mm. The angle as formed by the outflow direction of the inwardly directed annular opening (13) for discharging the solid fuel and the axis of the burner (1) is preferably between 3 and 45 degrees, more preferably between 5 and 30 degrees. It has been found that within this range an optimal contact between the oxygen containing gas and fuel is achieved while also achieving sufficient lifting of the flame and thus reduction of the heat flux.

The burner of FIG. 1 also has a preferred annular passage way (19) for fresh coolant positioned around the annular passage way (6). Around passage way (19) an annular passage way (20) is present for used coolant. Suitably passageways (6), (19) and (20) terminate at a connection block (21) provided with a central opening for the central passage way (5), multiple openings (22) for passage of used coolant to passage way (20) from a cooling jacket (23) and multiple openings (24) for passage of fresh coolant to cooling jacket (23) from passageway (19). The presence of connecting block (21) is advantageous because it enables one to simply replace a possibly damaged hollow member (9). The frusto-conical part of the hollow member can be removed by cutting away the cooling jacket (23) and the frusto conical wall part (26) of the central passage way (5) from connection block (21). The connection block (21) is suitably located at the point where the diameter of the central passage way (5) inverses from an increasing diameter to a decreasing diameter in order to allow simple removal as herein described.

Cooling jacket (23) is preferably a cooling jacket as described in the afore mentioned EP-A-328794 or as described in CN-A-101363624. Such a cooling jacket (23)

has double walls (28, 29) defining the exterior of the burner section starting at the connection block (21) and terminating at the burner front (2). The double walls (28, 29) are spaced by one or more baffles (30) defining a flow path for coolant encircling said burner section and part of the burner front (2). At burner front (2) the fresh coolant flows into opening (32) via a fresh coolant compartment (31) defined by wall (29) and wall (26) of the central passage way (5). Fresh coolant compartment (31) is fluidly connected to passageway (19) via openings (24).

The end of burner (1) having the supply connections for oxygen containing gas, solid fuel, fresh and used coolant is not shown in FIG. 1. A design as described in CN-A-101363622 may be suitably used for this purpose.

The references used in FIG. 2 have the same meaning as described above. In addition FIG. 2 shows the outer wall (27) of the annular passage way (20). FIG. 2 shows the preferred embodiment having three openings (17). In FIG. 1 the alternative embodiment of only one connecting conduit (14) and one opening (17) of the three openings is shown.

What is claimed is:

1. A burner for the gasification of a solid fuel, comprising a burner front having an opening for discharging a solid fuel and a single central opening for discharging an oxygen containing gas, wherein the opening for discharging the solid fuel is fluidly connected to a central passage way and wherein the opening for discharging the oxygen containing gas is fluidly connected to an annular passage way for passage of oxygen positioned co-axially with the central passage way and
   wherein the central passage way has a downstream part wherein the diameter of the passage way increases over a first length and subsequently decreases over a second length terminating at the burner front and wherein inside the downstream part of the central passage way a hollow member is positioned which is closed at one end and has an opening at the burner front, the hollow member having an increasing diameter and decreasing diameter aligned with the increasing and decreasing diameter of the central passage way to form an annular passage for the solid fuel terminating at burner front in a inwardly directed annular opening for discharging the solid fuel
   and wherein the hollow member is fluidly connected with the annular passage way for the oxygen containing gas by means of one or more connecting conduits and wherein the opening of the hollow member is the opening for discharging the oxygen containing gas at the burner front and wherein the hollow member has an internal increasing diameter and inner decreasing diameter aligned with the increasing and decreasing diameter of the hollow member and wherein the connecting conduits have a discharge opening positioned in the diverging part of the hollow member.

2. The burner according to claim 1, wherein discharge opening has an ellipsoidal form, wherein the longer dimension is aligned with the axis of the burner.

3. The burner according to claim 1, wherein the number of openings is 3.

4. The burner according to claim 1, wherein the number of openings is 1.

5. The burner according to claim 1, wherein the width of the rim of the hollow member at burner front separating the opening for discharging a solid fuel from the opening for discharging an oxygen containing gas is between 0.5 and 3 mm.

6. The burner according to claim 1, wherein the angle as formed by the outflow direction of the inwardly directed annular opening for discharging the solid fuel and the axis of the burner is between 3 and 45 degrees.

7. The burner according to claim 1, wherein the angle as formed by the outflow direction of the inwardly directed annular opening for discharging the solid fuel and the axis of the burner is between 5 and 30 degrees.

8. The burner according to claim 1, wherein the closed end of hollow member has a conical shape.

9. The burner according to claim 1, wherein around the annular passage way an annular passage way for fresh coolant is present and around passage way an annular passage way is present for used coolant, wherein passageways terminate at a connection block provided with a central opening for the central passage way, multiple openings for passage of used coolant to passage way from a cooling jacket and multiple openings for passage of fresh coolant to cooling jacket from passageway.

10. The burner according to claim 9, wherein connection block is located at the point where the diameter of the central passage way inverses from an increasing diameter to a decreasing diameter.

11. A process to prepare a mixture of hydrogen and carbon monoxide by means of gasification of a solid fuel, comprising: providing and using a burner according to claim 1 for the gasification of the solid fuel, wherein an oxygen containing gas is passed through passageway, a solid fuel and a carrier gas is passed through central passage and gasification takes place at burner front.

12. The process according to claim 11, wherein the oxygen containing gas as it is discharged from opening has a velocity of between 30 and 90 m/s and wherein the flow of solids as it is discharged from the annular opening at a velocity of between 5 and 15 m/s.

13. The process according to claim 11, wherein more than 2 kg/sec of solids is discharged from opening.

14. The process according to claim 11, wherein the solid is coal, petroleum coke or biomass.

15. The process according to claim 11, wherein the carrier gas is nitrogen or carbon dioxide.

* * * * *